(12) United States Patent
Kobayashi et al.

(10) Patent No.: US 7,518,644 B2
(45) Date of Patent: Apr. 14, 2009

(54) ELECTRONIC CAMERA HAVING PIXEL-ROW THINNING MODE

(75) Inventors: Hirokazu Kobayashi, Saitama (JP); Kazuya Oda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 440 days.

(21) Appl. No.: 11/489,602

(22) Filed: Jul. 20, 2006

(65) Prior Publication Data

US 2007/0030373 A1   Feb. 8, 2007

(30) Foreign Application Priority Data

Jul. 21, 2005   (JP) ............................. 2005-211471

(51) Int. Cl.
*H04N 9/64*   (2006.01)
*H04N 5/217*   (2006.01)

(52) U.S. Cl. ...................... 348/246; 348/241; 348/247

(58) Field of Classification Search ......... 348/246–247, 348/214, 248–251, 294, 315
See application file for complete search history.

(56) References Cited

U.S. PATENT DOCUMENTS 7,440,019 B2 * 10/2008 Suzuki et al. ............... 348/315

2006/0209198 A1 * 9/2006 Kitaoka et al. ............. 348/241

FOREIGN PATENT DOCUMENTS

JP   2002-135656 A   5/2002

* cited by examiner

*Primary Examiner*—Nhan T. Tran
*Assistant Examiner*—Mekonnen Dagnew
(74) *Attorney, Agent, or Firm*—Birch, Stewart, Kolasch & Birch, LLP

(57) ABSTRACT

Pixel rows of an image sensor are respectively provided with a vertical transfer path. A charge detecting amplifier is disposed at one end of each of the vertical transfer paths. When a through image is outputted and when a moving-image mode is executed, a horizontal scanning circuit sequentially selects the charge detecting amplifiers on the basis of a thinning pattern, which is determined every imaging sensitivity, to output an image signal in which the pixel rows are thinned. As the thinning pattern, there are an odd-row pattern for selecting only the odd pixel rows from among the whole pixel rows, and an even-row pattern for selecting only the even pixel rows therefrom. The thinning pattern is selected in accordance with the imaging sensitivity so as to minimize line-shaped defects caused by the vertical transfer paths.

10 Claims, 10 Drawing Sheets

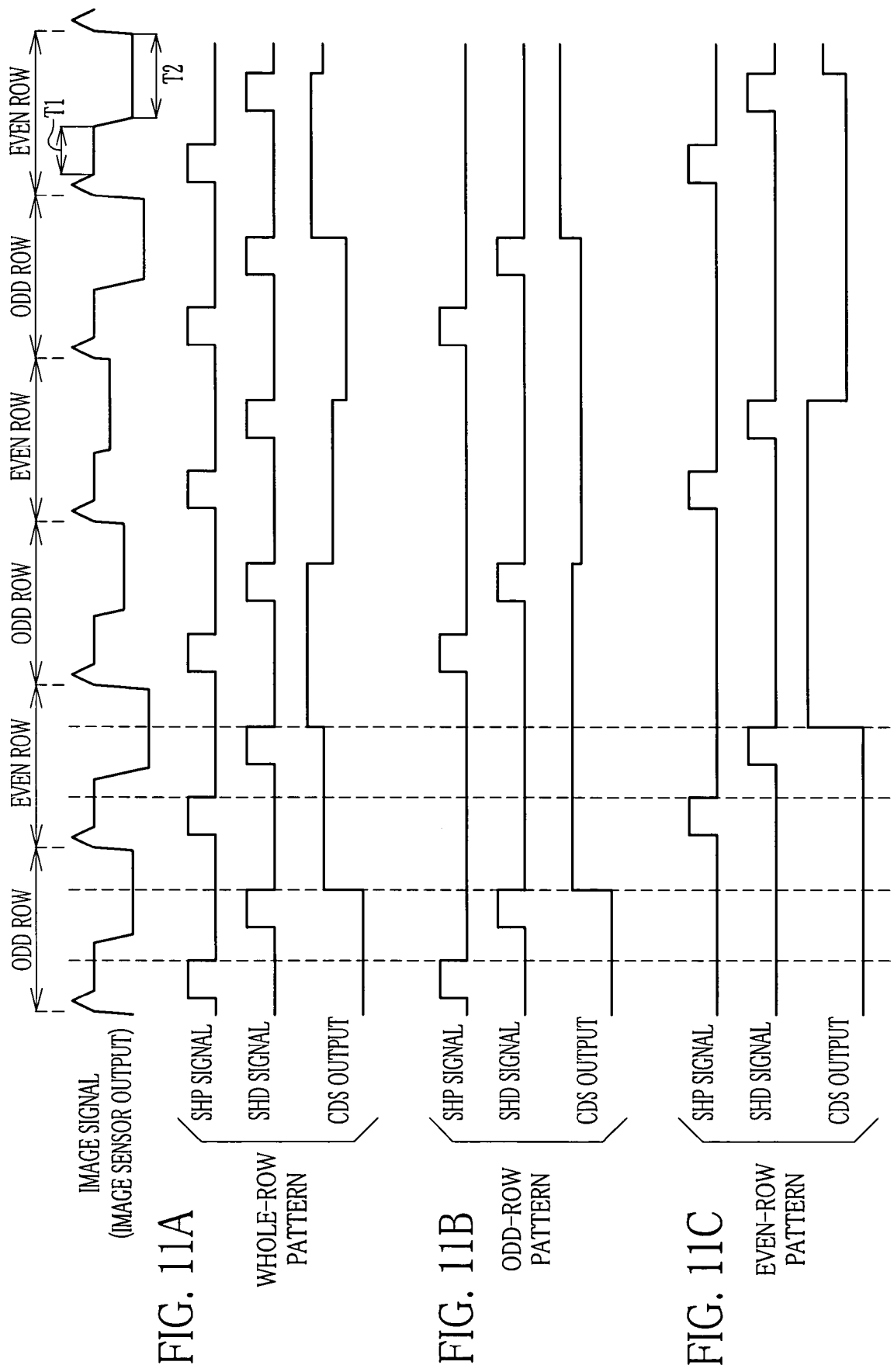

ELECTRONIC CAMERA HAVING PIXEL-ROW THINNING MODE

FIELD OF THE INVENTION

The present invention relates to an electronic camera having a pixel-row thinning mode.

BACKGROUND OF THE INVENTION

In recent years, electronic cameras are widely used. This kind of the electronic camera is provided with an image sensor for converting an optical subject image into an electrical signal. With respect to the image sensor, a CCD type and a CMOS type are mainly used. As a trend, the CCD image sensor is widely utilized because of advantage concerning high pixel density.

As to the CCD image sensor, there are an interline-type CCD, a frame-transfer-type CCD and so forth. For instance, the interline-type CCD is composed of a large number of pixels, a vertical transfer pass (vertical CCD), a horizontal transfer path (horizontal CCD), a charge detecting amplifier and so forth. The pixels comprise photo diodes and are arranged in a matrix. The vertical transfer path is provided for each pixel row including the pixels arranged in a vertical direction. Signal charges photoelectrically converted in the respective pixels are transferred to the vertical transfer path through a transfer gate and are sequentially forwarded thereby in a vertical direction. The horizontal transfer path is disposed at an end of the vertical transfer paths to receive the signal charges forwarded from the respective vertical transfer paths. The received signal charges are horizontally forwarded by the horizontal transfer path. The charge detecting amplifier converts the signal charge, which has been forwarded from the horizontal transfer path, into a voltage to be outputted.

Instead of the horizontal transfer path, the charge detecting amplifier may be disposed at an end of each of the vertical transfer paths. In this case, output of the respective charge detecting amplifiers is read by a horizontal scanning circuit. An image sensor having such structure is described in Japanese Patent Laid-Open Publication No. 2002-135656.

Some of the electronic cameras have a moving-image mode for recording a moving image, besides a still-image mode for taking a still image. Further, some of the electronic cameras have a through-image outputting function for displaying a subject on a liquid-crystal display or the like equipped on the electronic camera. When the moving-image mode is executed or when the through image is displayed, the image sensor is activated at a rate of 30 frames per second (30 fps), for example, in order to smoothly display the motion of the reproduced subject image. In recent years, however, the image sensor is improved so as to have high pixel density and it is difficult in some cases to transfer the charge of all the pixels and to output the signal during a one-frame period. In such cases, the CCD image sensor performs vertical pixel skipping and pixel mixture to vertically thin the pixels (line) on the image sensor. Incidentally, the pixel skipping and the pixel mixture are easily performed in the vertical direction by controlling the transfer gate.

Meanwhile, it is known that a defect occurs on the image sensor due to partial crystal faulty of a semiconductor and so forth. The defect of the image sensor deteriorates image quality. As to this kind of the defect, there is the defect of a dot shape (hereinafter referred to as dot defect) caused by the defective pixel. Beside the dot defect, there is the other defect which is caused by the vertical transfer path and has a line shape extending in the vertical direction (hereinafter, this sort of the defect is referred to as line defect). The line defect of a white line shape is caused by applying charge, which has no relation to the signal charge, to the vertical transfer path. Besides this, there is line-shaped density unevenness caused by a low transfer rate of a part of the vertical transfer path. However, it is difficult to produce the image sensor having no pixel and no vertical transfer path by which the defect is caused. Further, after producing the image sensor, the defect is likely to occur when ultraenergetic particles of cosmic rays and so forth enter the image sensor.

By the way, although the occurrence of the dot defect to be caused by the defective pixel may be avoided to some extent, it has been impossible to avoid the occurrence of the line defect because the line defect is caused by the vertical transfer path. Meanwhile, correction technique is established for not only the dot defect but also the line defect by performing defect correction for the output signal sent from the image sensor. However, when the many line defects occur, a processing period required for correcting the defects is long and a memory is excessively used for the purpose of correcting the defects. Thus, there is a problem in that a frame rate, a shooting number and so forth are often restricted. In addition, there is another problem in that image quality is likely to be deteriorated, although the line defects are corrected.

SUMMARY OF THE INVENTION

In view of the foregoing, it is a primary object of the present invention to provide an electronic camera capable of reducing correction of line-shaped defects, which are likely to deteriorate image quality in comparison with dot defects and are caused by a vertical transfer path.

In order to achieve the above and other objects, the electronic camera according to the present invention comprises a first memory, a second memory, a horizontal scanning device, and a defect corrector. The electronic camera includes an image sensor, on which a plurality of pixels are arranged in horizontal and vertical directions, and a sensitivity setter for setting one of imaging sensitivities. The image sensor includes a vertical transfer path provided for each pixel row of the vertically arranged pixels to vertically move a signal charge of the corresponding pixel row, and a charge detector provided for each of the vertical transfer paths to convert the signal charge outputted from the vertical transfer path into a voltage signal. The electronic camera thins the pixel rows under a thinning mode in accordance with the set imaging sensitivity.

The first memory stores first row-information of the respective imaging sensitivities. The first row-information designates the pixel rows to be read out under the thinning mode. The pixel rows to be read out are determined so as to minimize defective pixel rows having line-shaped defect extending in the vertical direction.

The second memory stores second row-information of the respective imaging sensitivities. The second row-information designates the defective pixel rows included in the pixel rows designated by the first row-information.

The horizontal scanning device sequentially selects the charge detectors of the pixel rows designated by the first row-information, which corresponds to the imaging sensitivity set by the sensitivity setter, under the thinning mode. The horizontal scanning device horizontally transfers and outputs the voltage signal of the selected charge detector.

The defect corrector corrects the defect regarding the voltage signals of the pixel rows designated by the second row-information, which corresponds to the imaging sensitivity set by the sensitivity setter, under the thinning mode.

In another embodiment, the electronic camera comprises the first memory, the second memory, a thinning device, and the defect corrector. In this embodiment, the image sensor includes the vertical transfer path, a horizontal transfer path for horizontally moving the signal charge received from the vertical transfer path, and a charge detector for converting the signal charge outputted from the horizontal transfer path into a voltage signal.

The thinning device reads only the voltage signals of the pixel rows designated by the first row-information, which corresponds to the imaging sensitivity set by the sensitivity setter, under the thinning mode.

It is preferable that the thinning device is a correlation double sampling circuit in which noise is removed by outputting a difference between a signal level and a reset level of the pixel.

It is preferable to further comprise an image memory for storing image data digitally converted every pixel from the voltage signals of the whole pixel rows outputted from the image sensor. The defect corrector corrects the defect regarding the image data of the respective pixel rows designated by the second row-information. The thinning device derives only the image data of the respective pixel rows, which are designated by the first row-information, from the image memory.

According to the present invention, when the pixel rows are thinned, the pixel rows to be read are controlled every imaging sensitivity so as to minimize the line-shaped defect extending in the vertical direction. Further, defect correction is performed only for the defective pixel rows included in the pixel rows to be read. Thus, it is possible to minimize the defect of the image obtained by thinning the pixel rows. In addition, since the defect correction is reduced, a burden thereof is lightened.

BRIEF DESCRIPTION OF THE DRAWINGS

FIG. 11 is a timing diagram showing sample holding timing of the CDS circuit.

DESCRIPTION OF THE PREFERRED EMBODIMENTS

Figure 1:
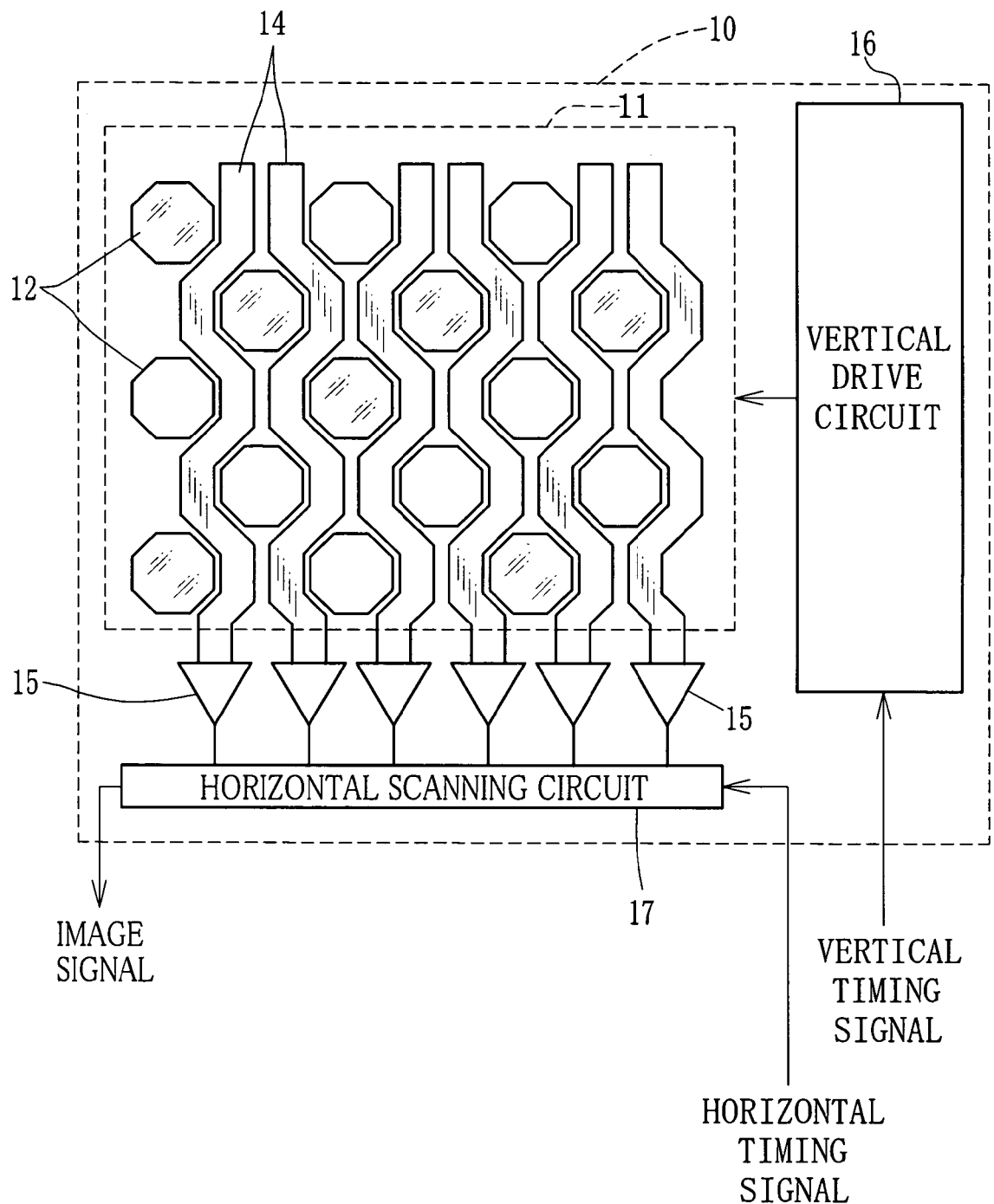
FIG. 1 is an explanatory illustration showing an image sensor used in an electronic camera according to the present invention.

FIG. 1 schematically shows a structure of a CCD image sensor 10 used in an electronic camera according to the present invention. A light receiving surface 11 of the image sensor 10 is provided with a large number of pixels 12. The pixel 12 comprises a photodiode for photoelectrically converting incident light (subject light) and stores a signal charge in accordance with an amount of the incident light. The pixels 12 arranged in a horizontal direction compose a line, and the pixels 12 arranged in a vertical direction compose a row (hereinafter referred to as pixel row).

In the image sensor 10, the pixels 12 are arranged at constant pitch in the horizontal direction. In this regard, the pixels 12 of the respective lines are horizontally shifted by half the pitch relative to the pixels 12 of the adjacent lines. In other words, the pixels 12 have a honeycomb arrangement. In fact, about six million pixels 12 (about two thousand lines×three thousand rows) are arranged on the light receiving surface 11. Incidentally, the honeycomb arrangement is not exclusive. The image sensor may have the pixels of a square lattice form.

Each of the pixel rows is provided with a vertical transfer path (vertical CCD) 14. One end of the respective vertical transfer paths 14 is provided with a charge detecting amplifier 15, which converts the inputted signal charge into a voltage to be outputted. A vertical drive circuit 16 sends various vertical drive signals to the vertical transfer path 14 on the basis of a vertical timing signal outputted from a timing generator disposed at the outside of the image sensor 10. By virtue of the vertical drive signal, the signal charge stored in the pixel 12 during the exposure period is transferred to the vertical transfer path 14 through a transfer gate (not shown), which is provided for each pixel, after the exposure period has passed. Further, the signal charge is sequentially moved in the vertical transfer path 14 every horizontal scanning period and is sent to the charge detecting amplifier 15.

While the signal charge is vertically moved, it is possible for the signal charge of any pixel 12 to add the signal charge of the other pixel 12 of the same pixel row in the vertical transfer path by controlling the signal charge to be transferred from the pixel 12 to the vertical transfer path 14, and transfer timing thereof. In other words, it is possible to perform pixel mixture while the signal charge is vertically moved.

A horizontal scanning circuit 17 sequentially selects the charge detecting amplifiers 15 in accordance with a predetermined selection pattern upon input of a horizontal timing signal. The horizontal scanning circuit 17 forwards outputs of the selected amplifiers 15 to a signal output line as an image signal. In this way, the horizontal scanning circuit 17 performs horizontal scanning. Since the horizontal scanning circuit 17 selectively reads the charge detecting amplifiers 15, it is possible to output the image signal for which thinning of the pixel row has been performed.

As to the selection pattern of the horizontal scanning circuit 17, there are a whole-row pattern for sequentially selecting all the amplifiers 15 without thinning the pixel rows, and thinning patterns for thinning the pixel rows. The thinning patterns include an odd-row pattern for selecting the odd rows (first row, third row, fifth row and so on) from among all the pixel rows, and an even-row pattern for selecting the even rows (second row, fourth row, sixth row and so on) from among all the pixel rows. The patterns for selecting the pixel rows are changed by altering parameters to be set in the timing generator and by altering generation timing and so forth of the horizontal timing signal.

Figure 2:
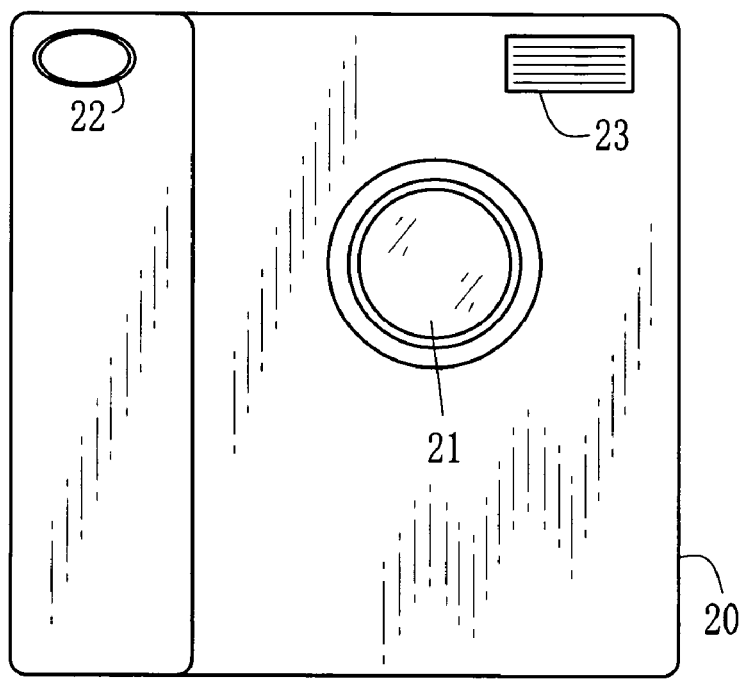
FIG. 2 is a front view showing the electronic camera.
Figure 3:
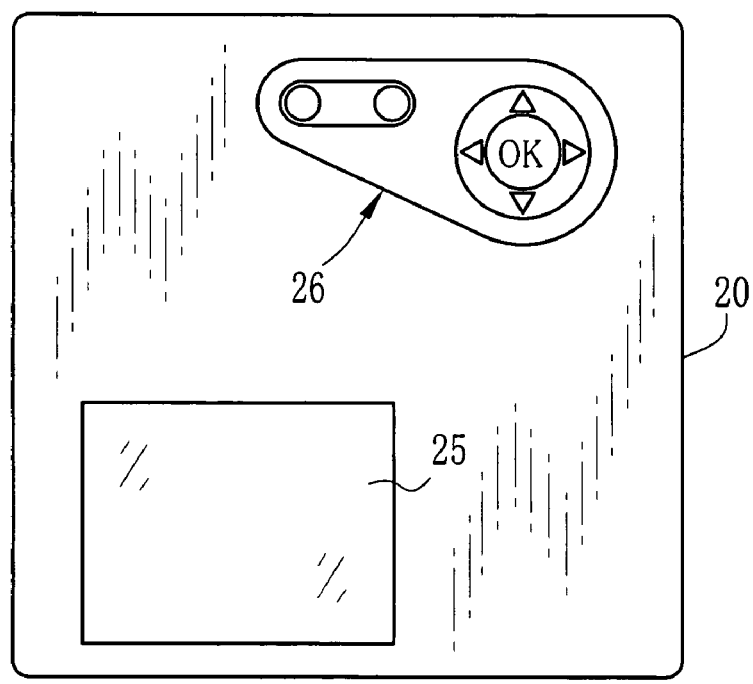
FIG. 3 is a rear view showing the electronic camera.

FIG. 2 shows a front side of an electronic camera 20 and FIG. 3 shows a rear side thereof. The front of the electronic camera 20 is provided with a taking lens 21, a release button 22 and a flash emitter 23. The rear of the electronic camera 20 is provided with an LCD 25 and an operating unit 26. The lateral side of the electronic camera 20 is provided with a memory slot (not shown) into which a memory card is inserted to recode a taken still image.

The operating unit 26 comprises various operation buttons, a cursor key and so forth. By operating these components, it is possible to change a reproduction mode, a shooting mode and an adjustment mode. It is also possible to change a still-image mode and a moving-image mode under the shooting mode. Further, it is possible to set imaging sensitivity under the shooting mode. Incidentally, it is possible to set the imaging sensitivity of ISO100, ISO200 and ISO400.

Under the shooting mode, a subject image is displayed on the LCD 25 in real time. In other words, a through image is outputted under the shooting mode. Upon pressing the release button 22 under the still-image mode, a still image is taken and is recorded in the memory card. Upon pressing the release button 22 under the moving-image mode, it is started to take a moving image. Upon next pressing of the release button 22, taking the moving image is stopped. Similarly to the still image, the moving image is also recorded in the memory card. In this embodiment, thinning the pixel row is performed at the times when the through image is outputted and when the moving-image mode is executed. At both times, a number of the pixel rows is reduced to half. Under the adjustment mode, the pixel row to cause line defect (hereinafter referred to as defective pixel row) is detected. The line defect is caused by the vertical transfer path 14 of the image sensor 10 when the through image is outputted or when the moving-image mode is executed. The thinning pattern is determined every imaging sensitivity at the time of thinning so as to minimize the line defect.

Figure 4:
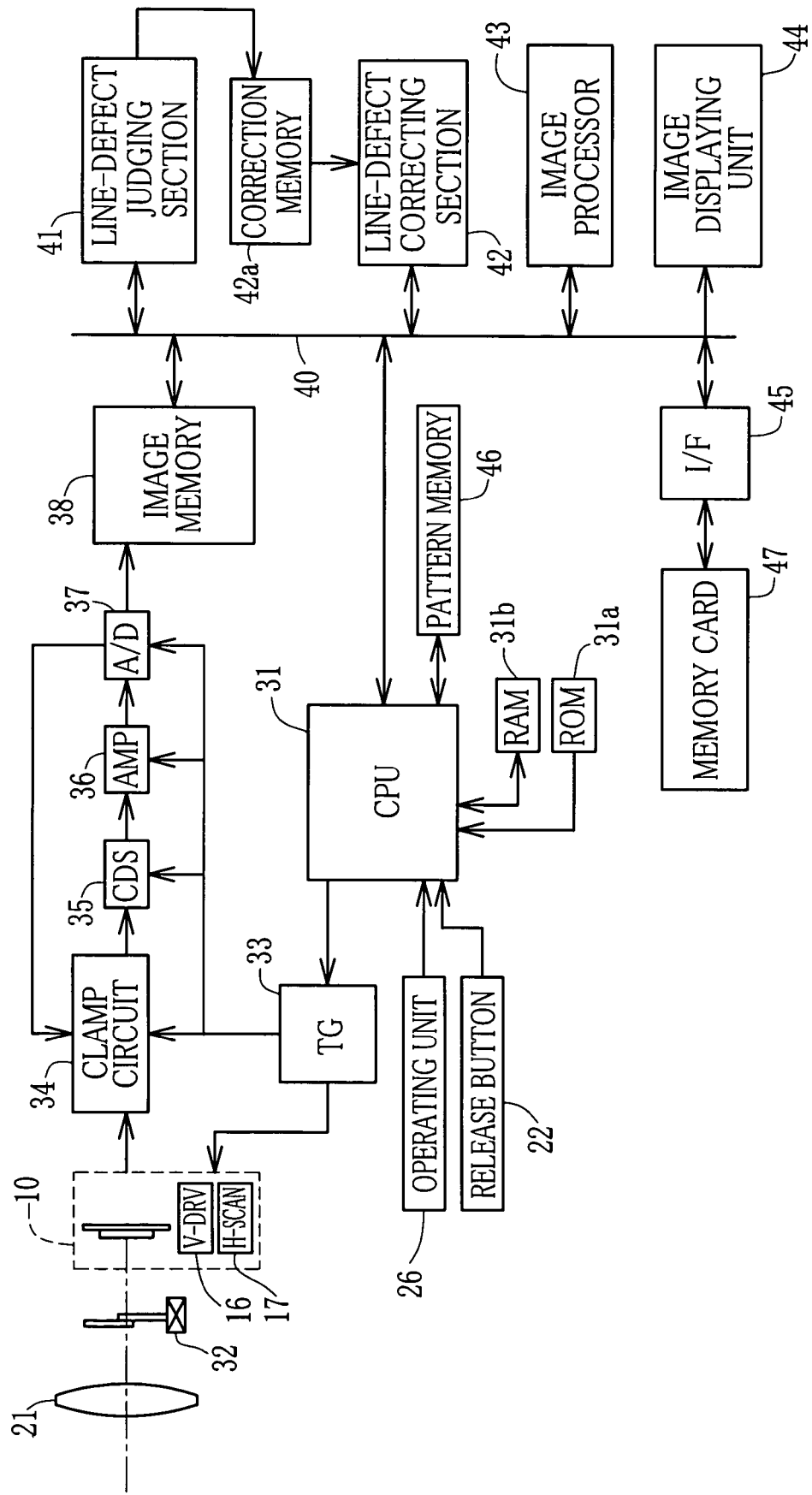
FIG. 4 is a block diagram showing a structure of the electronic camera.

A structure of the electronic camera 20 is shown in FIG. 4. A CPU 31 controls each section of the electronic camera 20 in response to the operations of the release button 22 and the operating unit 26. The CPU 31 is connected to a ROM 31a and a RAM 31b. A program for executing a sequence, which concerns shooting and so forth of the electronic camera 20, is written in the ROM 31a beforehand. In accordance with this program, the CPU 31 controls the respective sections. The RAM 31b is used as a work memory for temporarily storing data while the sequence is executed.

The taking lens 21 is adjusted by a focusing mechanism (not shown) so as to bring a subject into focus. The image sensor 10 is disposed behind the taking lens 21 so as to interpose a shutter device 32 between them. The shutter device 32 is movable between a closed position and an open position. In the closed position, a shutter blade is closed to prevent shooting light, which has passed through the taking lens 21, from entering the image sensor 10. In the open position, the shutter blade is opened to allow the subject light to enter the image sensor 10. The shutter device 32 is normally kept in the open position and is changed to the closed position to avoid occurrence of smears just after exposure of the image sensor 10 has been completed at the time of still-image shooting. Incidentally, the shutter device 32 is kept in the closed position under the adjustment mode.

A timing generator 33 outputs timing signals to activate the vertical drive circuit 16 and the horizontal scanning circuit 17. On the basis of the timing signals, the operation is performed from the exposure of the image sensor 10 until the output of the image signal. When the through image is outputted or when the moving-image mode is executed, the timing generator 33 activates the image sensor 10 so as to thin the pixel lines and the pixel rows. The pixel lines are thinned by two-pixel mixture. The pixel rows are thinned and a number thereof is reduced to half.

A clamp circuit 34 adjusts a black revel of the image signal on the basis of image data obtained during an optical black period. For the respective pixels, a CDS (Correlation Double Sampling) circuit 35 holds samples of a feed-through region and a pixel-signal region of the image signal sent from the clamp circuit 34. Correlated noise of a reset pulse is superimposed on the feed-through region. The CDS circuit 35 outputs a difference between the samples of the feed-through region and the pixel-signal region as the image signal from which reset noise is removed. An amplifier 36 amplifies the image signal with a gain set by the CPU 31. The CPU 31 sets the gain of the amplifier 36 in accordance with the imaging sensitivity determined by an operation of the operating unit 26. An A/D converter 37 converts the image signal, which is sent from the amplifier 36, into image data of each pixel. Incidentally, the imaging sensitivity is determined by means of the operating unit 26 in this embodiment. However, the imaging sensitivity may be determined in accordance with subject brightness, for example.

By inputting various timing signals from the timing generator into the clamp circuit 34, the CDS circuit 35, the amplifier 36 and the A/D converter 37, each of them is activated in synchronization with the output operation of the image signal of the image sensor 10.

An image memory 38 temporarily stores the image data. The image memory 38 is capable of storing the image data of plural frames. In addition, the image memory 38 is capable of accessing the image data of the other frame while writing the image data transferred from the A/D converter 37.

The image memory 38 is connected to a bus 40 to which the CPU 31, a line-defect judging section 41, a line-defect correcting section 42, an image processor 43, an image displaying unit 44 and an interface circuit 45 are connected as well. It is possible to mutually transfer and receive the data via the bus 40.

The line-defect judging section 41 detects the defective pixel row, which causes the line defect as described above, under the adjustment mode. In addition, the line-defect judging section 41 determines the thinning pattern, on the basis of which the pixel rows are thinned at the time of the moving-image mode and at the time of the through-image output. Meanwhile, when identifying the line defect, the horizontal scanning circuit 17 outputs the image signal with the whole-row pattern. At the detection time of the defective pixel, the image data of one frame is compared with a prescribed threshold. When the pixels exceeding the threshold continue in the same pixel row by a predetermined number, this pixel row is regarded as the defective pixel row. Detecting the defective pixel row is performed for each of the settable imaging sensitivities. This is because the pixel row, which is not regarded as the line defect in the case of the low imaging sensitivity, is sometimes judged as the line defect in the case of the high imaging sensitivity under the condition of the same threshold, since the gain of the amplifier 36 becomes higher in the case of the high imaging sensitivity.

Information concerning the defective pixel row is written in a correction memory 42a by the line-defect judging section 41 as line-defect information. The line-defect judging section 41 writes the line-defect information regarding the respective imaging sensitivities. The line-defect information includes a location of the defective pixel row occurring on the light receiving surface 11. The line-defect information also includes a signal level of the line defect of each defective pixel row. Further, the line-defect judging section 41 determines the thinning pattern to be used at the times when the moving-image mode is executed and when the through image is outputted. The thinning pattern is determined for the respective imaging sensitivities on the basis of the line-defect information so as to minimize the line defects. Results of the determination made for the respective imaging sensitivities are written in a pattern memory 46 via the CPU 31. When a number of the defective pixel rows of the even pixel rows is less than that of the odd pixel rows, the line-defect judging section 41 determines the even-row pattern in which the even pixel rows are selected. By contrast, when the number of the defective pixel rows of the even pixel rows is more than that of the odd pixel rows, the line-defect judging section 41 determines the odd-row pattern in which the odd pixel rows are selected. Incidentally, when the number of the defective pixel rows of the even pixel rows is identical with that of the odd pixel rows, the even-row pattern is used. However, the odd-row pattern may be used.

In this embodiment, the pattern memory 46 stores first row-information identifying the pixel rows to be read out. The first row-information identifies either of the even pixel row and the odd pixel row. Meanwhile, the correction memory 42a stores second row-information identifying the defective pixel rows included in the pixel rows to be read out. The first row-information and the second row-information are stored regarding each of the imaging sensitivities. When all the pixel rows are used for taking the still image, the line-defect information concerning the all defective pixel rows is necessary. For this reason, the correction memory 42a of this embodiment stores the line-defect information concerning all of the defective pixel rows. However, under the thinning mode, it is sufficient that the correction memory 42a stores only the line-defect information concerning the defective pixel rows included in the pixel rows to be read out.

When the through image is outputted under the shooting mode or when the moving-image mode is executed, the CPU 31 accesses the pattern memory 46 to derive the thinning pattern corresponding to the designated imaging sensitivity. Further, the CPU 31 sets the parameters to the timing generator 33 in accordance with the derived thinning pattern. In this way, horizontal scanning is performed with the thinning pattern, which is determined under the adjustment mode, when the through image is outputted or when the moving-image mode is executed.

On the basis of the contents of the correction memory 42a, the line-defect correcting section 42 performs defect correction for the image data contained in the image memory 38 and corresponding to the defective pixel row. For example, the defect correction is performed such that the image data of the defective pixel row is replaced with image data produced on the basis of the image data of the pixel rows adjacent to the defective pixel row. In virtue of this, the image of which the line defect is corrected is obtained.

For the image data, the image processor 43 performs image processing of offset correction, white-balance correction, gamma conversion, synchronization processing, contour emphasis processing, noise reduction, saturation emphasis processing, compression processing and so forth. The image displaying unit 44 is composed of the LCD 25, a driver for activating the LCD 25, a VRAM and so forth. Under the shooting mode, the image data processed by the image processor 43 is sequentially inputted into the image displaying unit 44 to display the subject image on the LCD 25 as the through image. Under the reproduction mode, the image data read out of the memory card 47 is inputted into the image displaying unit 44 to display the taken image on the LCD 25.

The interface circuit 45 reads and writes the data of the memory card 47 loaded into the memory slot. The image data of the moving image and the still image taken by the electronic camera 20 is processed and compressed in the image processor 43, and then is written in the memory card 47 via the interface circuit 45. Under the reproduction mode, the interface circuit 45 reads the image data from the memory card 47. The read image data is decompressed in the image processor 43 and is transferred to the image displaying unit 44 to display the image data on the LCD 25.

An operation of the above structure is described bellow. Before taking an image with the electronic camera 20, the adjustment mode is selected at the outset to execute adjustment sequence in advance for determining the thinning pattern in accordance with the imaging sensitivity. It is unnecessary to execute the adjustment sequence whenever shooting is performed. The adjustment sequence is executed when the electronic camera is used first after manufacture and when the line defect occurs on the taken image due to aging phenomena or the like.

Figure 5:
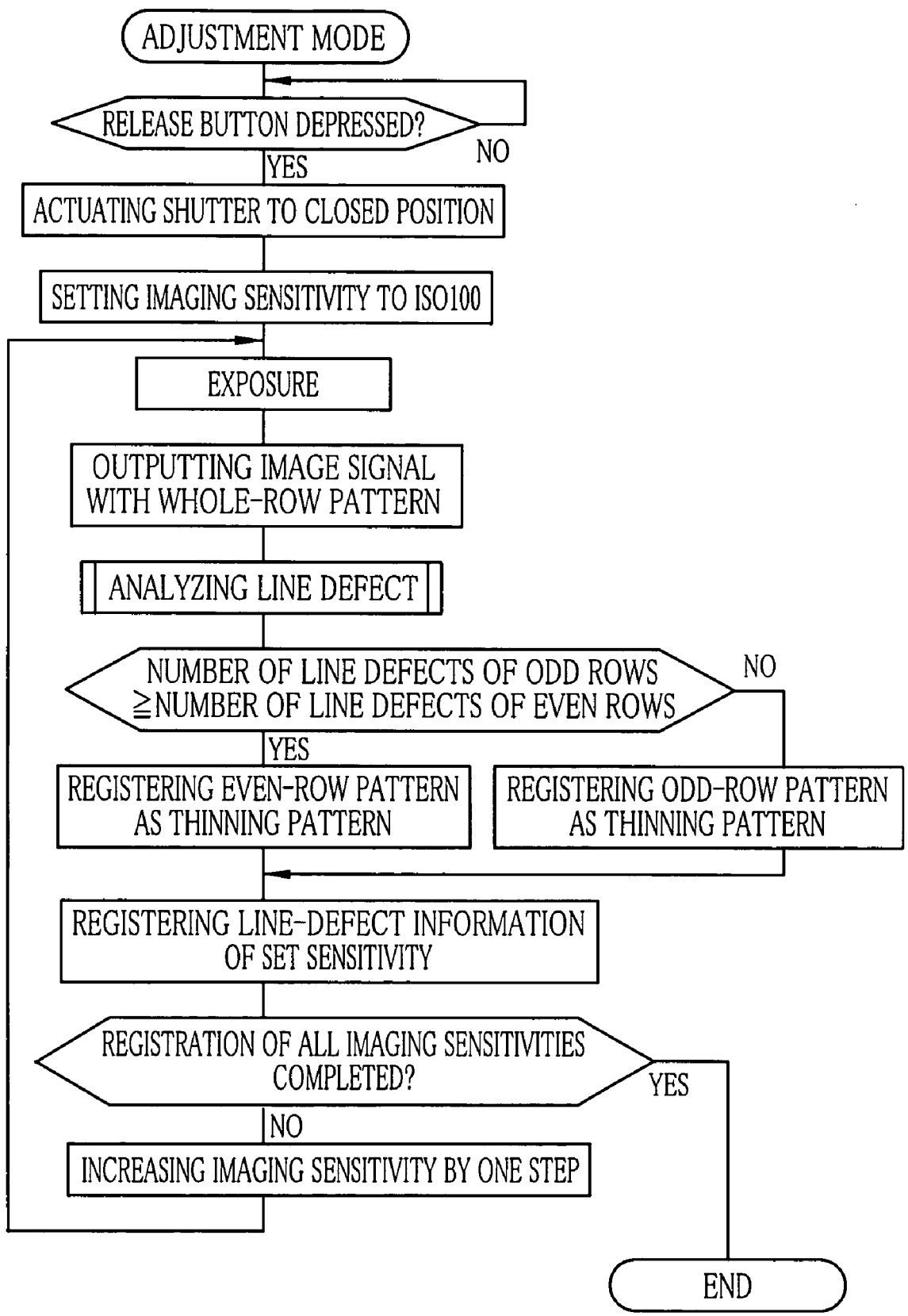
FIG. 5 is a flowchart showing a procedure of an adjustment mode.

After selecting the adjustment mode by handling the operating unit 26, the adjustment sequence is started upon pressing the release button 22, for instance. As shown in FIG. 5, the shutter device 32 is moved to the closed position first to keep the image sensor 10 in the light-shielding condition. Successively, the gain corresponding to the imaging sensitivity of ISO100 is set to the amplifier 36 by the CPU 31. Further, the parameters for performing the exposure of the image sensor 10 and the horizontal scanning are set to the timing generator 33. On this occasion, the horizontal scanning is performed with the whole-row pattern after the image sensor 10 has been exposed for a predetermined period.

The image sensor 10 is activated on the basis of the parameter set in the timing generator 33 and is exposed in the light shielding condition. In other words, the respective pixels 12 store the signal charge in the light shielding condition. After the exposure, the signal charge stored in each pixel 12 is forwarded to the corresponding vertical transfer path 14 and is moved thereon. And then, the signal charge is sequentially inputted into the charge detecting amplifier 15. Whenever the signal charge is moved by one line on the vertical transfer path 14, the horizontal scanning circuit 17 receives the horizontal timing signal from the timing generator 33 to select all of the charge detecting amplifiers 15 in turn. In this way, the signal charges of all the pixel rows of the light receiving surface 11 are read out and are outputted as the image signal.

The image signal outputted from the image sensor 10 is inputted into the amplifier 36 via the clamp circuit 34 and the CDS circuit 35. The amplifier 36 amplifies the image signal with the gain corresponding to the imaging sensitivity of ISO100. The A/D converter 37 converts the amplified image signal into the image data of the respective pixels 12. The converted image data is written in the image memory 38.

Such as described above, the image data of one frame is written in the image memory 38. After that, the line-defect judging section 41 analyzes the line defect. The image data of each pixel row is read in turn from the image memory 38 to judge the defective pixel row. At the judgment time, the read image data of each pixel row is compared with the prescribed threshold in order. During the comparison, the pixel row is judged as the defective pixel row when the image data exceeding the prescribed threshold continues by a predetermined number.

After completing the judgment for all the pixel rows of one frame, the line-defect judging section 41 counts the defective pixel rows with respect to both of the odd row and the even row. When the number of the defective pixel rows of the even pixel rows is more than that of the odd pixel rows, the odd-row pattern is determined as the thinning pattern for the imaging sensitivity of ISO100. In contrast, when the number of the defective pixel rows of the odd pixel rows is more than that of the even pixel rows, the even-row pattern is determined as the thinning pattern for the imaging sensitivity of ISO100. The determined relation of the imaging sensitivity and the thinning pattern is written in the pattern memory 46. Moreover, the location of the defective pixel row and the signal level thereof are written and registered in the correction memory 42a as the line-defect information of the imaging sensitivity ISO100.

As described above, the thinning pattern and the line-defect information are written with respect to the imaging sensitivity of ISO100. After that, the CPU 31 sets the gain, which corresponds to the imaging sensitivity of ISO200, to the amplifier 36 to increase the imaging sensitivity by one step. And then, similarly to the case of the imaging sensitivity ISO100, the thinning pattern corresponding to the image sensitivity of ISO200 is determined and is written in the pattern memory 46. Further, the line-defect information is written in the correction memory 42a with respect to the imaging sensitivity of ISO200. Successively, the thinning pattern and the line-defect information concerning the imaging sensitivity of ISO400 are similarly registered. In this way, the adjustment sequence is executed.

Figure 6:
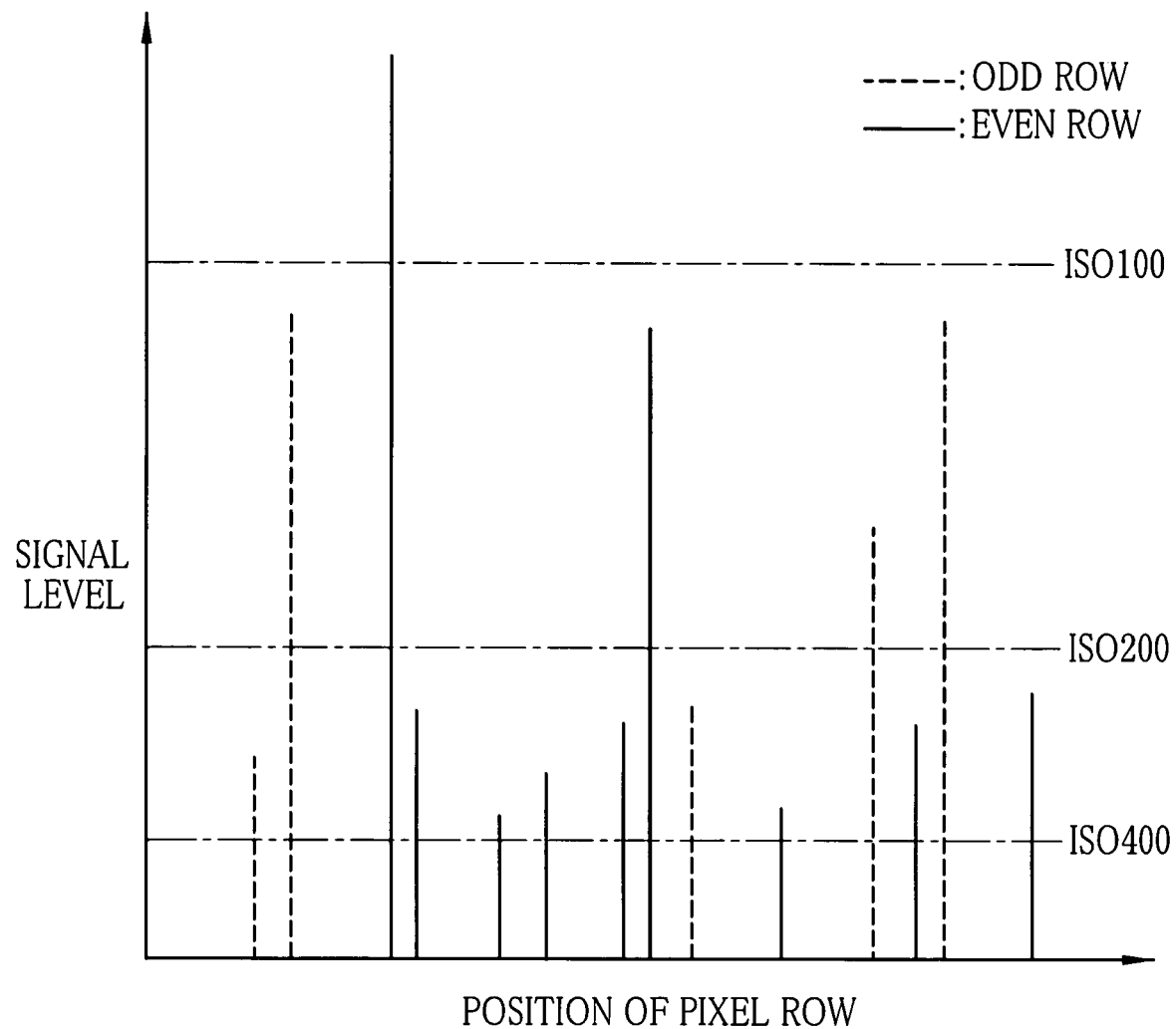
FIG. 6 is a graph showing an example of a pixel row and a signal level.

FIG. 6 shows an example of the signal levels of the respective pixel rows including the defective pixel rows. In FIG. 6, dashed lines represent the thresholds of the respective imaging sensitivities. For the respective imaging sensitivities, the same threshold is used. Although the signal levels of the pixel rows change in accordance with the imaging sensitivities, the signal levels of the pixel rows are illustrated in FIG. 6 so as to coincide with each other regarding the respective imaging sensitivities.

As shown in FIG. 6, when the imaging sensitivity is ISO100, the sole pixel row of the even row is judged as the defective pixel row. Thus, the odd-row pattern is written in the pattern memory 46 as the thinning pattern. When the imaging sensitivity is ISO200, three odd rows and two even rows are detected as the defective pixel rows. Thus, the even-row pattern is written in the pattern memory 46 as the thinning pattern. When the imaging sensitivity is ISO400, five odd rows and nine even rows are detected as the defective pixel rows. Thus, the odd-row pattern is written in the pattern memory 46 as the thinning pattern.

At the time of shooting, the operating unit 26 is handled to select the shooting mode, and then under this shooting mode, either of the still-image mode and the moving-image mode is selected. Further, the operating unit 26 is handled to determine the imaging sensitivity, and the gain corresponding thereto is set to the amplifier 36.

Figure 7:
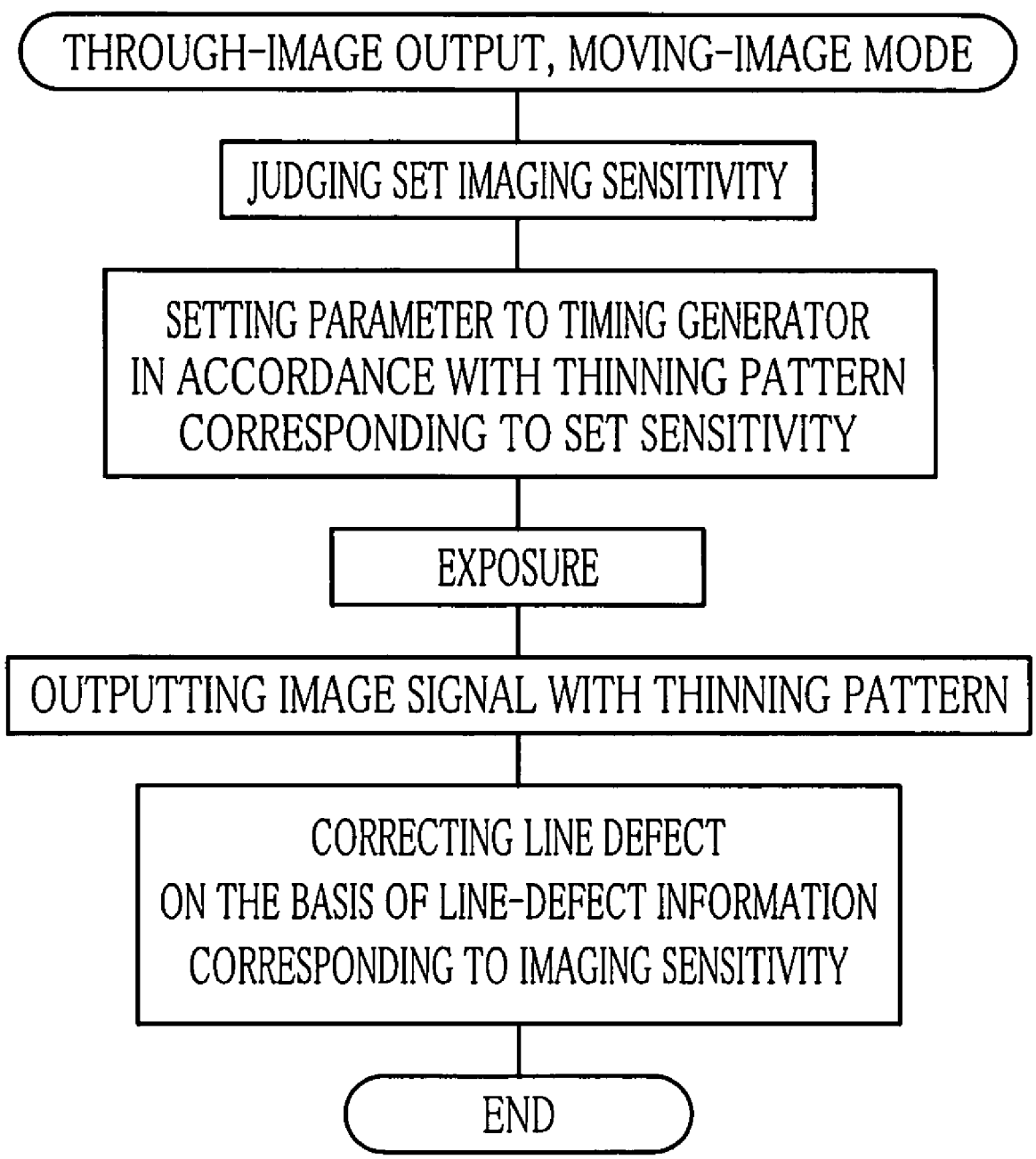
FIG. 7 is a flowchart showing a procedure performed at times when a through image is outputted and when a moving-image mode is executed.

Upon selection of the shooting mode, the parameter for outputting the through image is set to the timing generator 33 by the CPU 31. At this time, for the purpose of outputting the image signal of one frame at a frame rate of 1/30 sec., for example, the CPU 31 accesses the pattern memory 46 to derive the thinning pattern corresponding to the set imaging sensitivity, such as shown in FIG. 7. Successively, the CPU 31 sets the derived thinning pattern. In addition, the parameter is set to the timing generator 33 so as to perform the pixel mixture in the vertical direction.

After the parameter for outputting the through image has been set, the image sensor 10 performs the exposure of one frame during the one-frame period of 1/30 sec. in accordance with subject brightness. After the one-frame period, the signal charge of each pixel 12, which is included in an odd line for example, is sent to the vertical transfer path 14 and is moved thereon by one line. After that, the signal charge of an even line is sent to the vertical transfer path 14 to add the signal charges of two pixels adjacent in the vertical direction.

The exposure is repeated every 1/30 sec. and the signal charge of the mixed pixels is sequentially forwarded to the charge detecting amplifier 15 during the succeeding one-frame exposure. The charge detecting amplifier 15 converts the signal charge, which is inputted from the vertical transfer path 14, into a voltage to be outputted. The charge detecting amplifier 15 of either of the odd row and the even row is sequentially selected by the horizontal scanning circuit 17 activated in response to the horizontal timing signal sent from the timing generator 33.

When the defective pixel row is judged in the example shown in FIG. 6 and the imaging sensitivity of ISO200 is set, the parameter is set to the timing generator 33 so as to perform the horizontal scanning with the even-row pattern. Consequently, the horizontal scanning circuit 17 sequentially selects the charge detecting amplifiers 15 corresponding to the even pixel rows. The selection of the respective amplifiers 15 is performed for each line after the pixel mixture. In this way, the image signal outputted from the horizontal scanning circuit 17 is thinned so as to reduce the numbers of the rows and the lines to half of those of the light receiving surface 11. What is more, the image signal is produced from the signal charge of the even pixel row.

The image signal outputted from the image sensor 10 is inputted into the amplifier 36 via the CDS circuit 35, and is amplified with the gain corresponding to the imaging sensitivity of ISO200. The amplified image signal is converted by the A/D converter 37 into the image data to be written in the image memory 38.

At the time of output of the through image, the line-defect correcting section 42 accesses the correction memory 42a to check the line-defect information corresponding to the set imaging sensitivity. On the basis of the line-defect information, the location of the defective pixel row is identified. After the image data has been written in the image memory 38, the image data corresponding to the identified defective pixel row is replaced with the image data, which is produced on the basis of the surrounding image data thereof, to correct the defect.

After the defect correction, the image data is transferred to the image processor 43 and is processed regarding the gamma correction, the white-balance correction and so forth. The processed image data is transferred to the image displaying unit 44 into which the image data of one frame is inputted every 1/30 sec. to display the through image on the LCD 7 in a state that the defect is corrected.

Upon changing the setting of the imaging sensitivity, the gain corresponding thereto is set to the amplifier 36. At the same time, the thinning pattern corresponding to the newly-set imaging sensitivity is read out of the pattern memory 46 and the parameter corresponding to the read thinning pattern is set to the timing generator 33. An operation for outputting the through image is similarly performed. Further, the location of the defective pixel row is identified on the basis of the line-defect information corresponding to the newly-set imaging sensitivity to correct the defect.

Upon pressing the release button 22 under the moving-image mode, the image data of each frame, which is obtained from the A/D converter 37 in a similar manner to the through image, is sequentially written in the image memory 38 until the release button 22 is pressed again to stop taking the moving image. As to the image data of each frame of the moving image written in the image memory 38, the defect thereof is corrected in order by the line-defect correcting section 42 in the image memory 38. This defect correction is similarly performed to the through image.

After the moving-image mode has been stopped by pressing the release button 22 again, the image processor 43 performs the gamma correction, the white-balance correction and so forth for the image data stored in the image memory 38. Further, the image data is compressed. The compressed image data of the moving image is transferred to the interface circuit 45 and is written in the memory card 47.

In this way, at the times when the through image is outputted and when the moving-image mode is executed, the odd pixel rows or the even pixel rows are read out so as to minimize the defective pixel rows to be read, regardless of the imaging sensitivity. Thus, it is possible to reduce the pixel rows having the defect to be corrected, and it is possible to minimize an influence on quality of the image to be displayed or to be recorded.

When the still-image mode is selected, the parameter for taking the still image is set in the timing generator 33 upon pressing the release button 22. At this time, the parameter for using the whole-row pattern is set in the timing generator 33.

After setting the parameter, the signal charge of each pixel 12 is stored during the exposure period depending on the subject brightness. After the exposure, all the signal charges are simultaneously sent to the vertical transfer paths 14, and are further sent thereon toward the charge detecting amplifiers 15. And then, the voltage is outputted from the respective amplifiers 15. Based on the horizontal timing signal outputted from the timing generator 33, the horizontal scanning circuit 17 sequentially selects the charge detecting amplifiers 15 of the whole rows. Selecting the respective amplifiers 15 is performed for each line. The horizontal scanning circuit 17 outputs the image signal produced from the signal charges of the whole rows and the whole lines.

The one-frame image signal outputted as described in the foregoing is inputted into the A/D converter 37 via the CDS circuit 35 and the amplifier 36. The inputted image signal is converted into the image data to be written in the image memory 38. Defect of the image data written in the image memory 38 is corrected by the defect correcting section 42 in the image memory 38. At this time, the defect correcting section 42 corrects the defect on the basis of the whole defect information which corresponds to the imaging sensitivity written in the correction memory 42a.

After correcting the defect, the image processor 43 performs the gamma correction, the white-balance correction and so forth for the image data of the image memory 38. Successively, the image processor 43 performs the data compression. The compressed image data of the still image is transferred to the interface circuit 45 and is written in the memory card 47.

A second embodiment adopting an image sensor provided with a horizontal transfer path is described below. Incidentally, the second embodiment is similar to the first embodiment except the following. A component identical with that of the first embodiment is denoted by the same reference numeral and description thereof is abbreviated.

Figure 8:
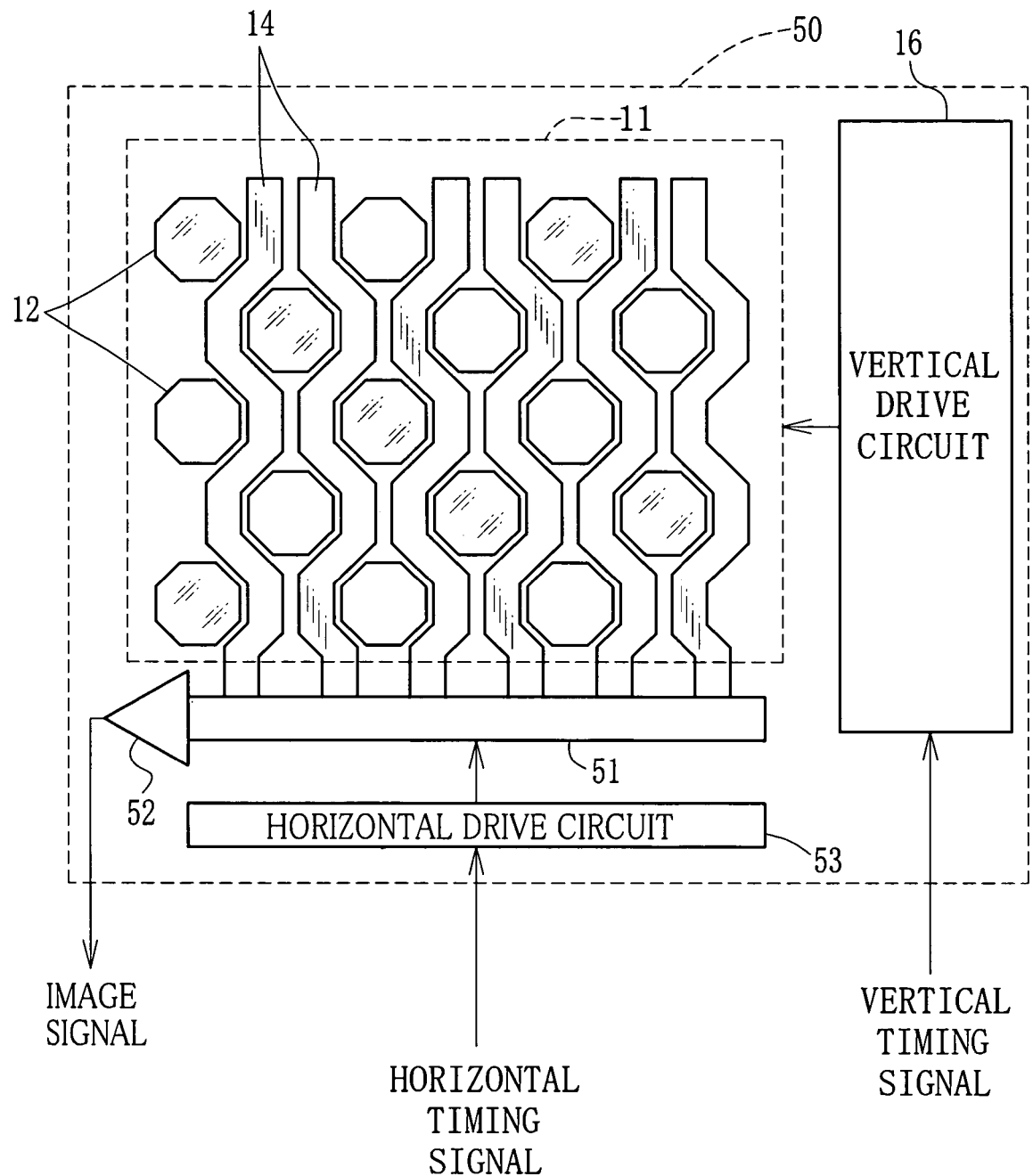
FIG. 8 is an explanatory illustration showing an image sensor having a horizontal transfer path.

As shown in FIG. 8, a horizontal transfer path 51 of an image sensor 50 is connected to the respective vertical transfer paths 14. The signal charges are forwarded from the vertical transfer paths 14 to the horizontal transfer path 51 one line by one line. An end of the horizontal transfer path 51 is connected to a charge detecting amplifier 52. A horizontal drive circuit 53 sends various horizontal drive signals to the horizontal transfer path 51 on the basis of horizontal timing signals outputted from a timing generator 54 (see FIG. 9). In virtue of this, the signal charge is forwarded to the charge detecting amplifier 52 and is converted into a voltage to be outputted as an image signal.

Figure 9:
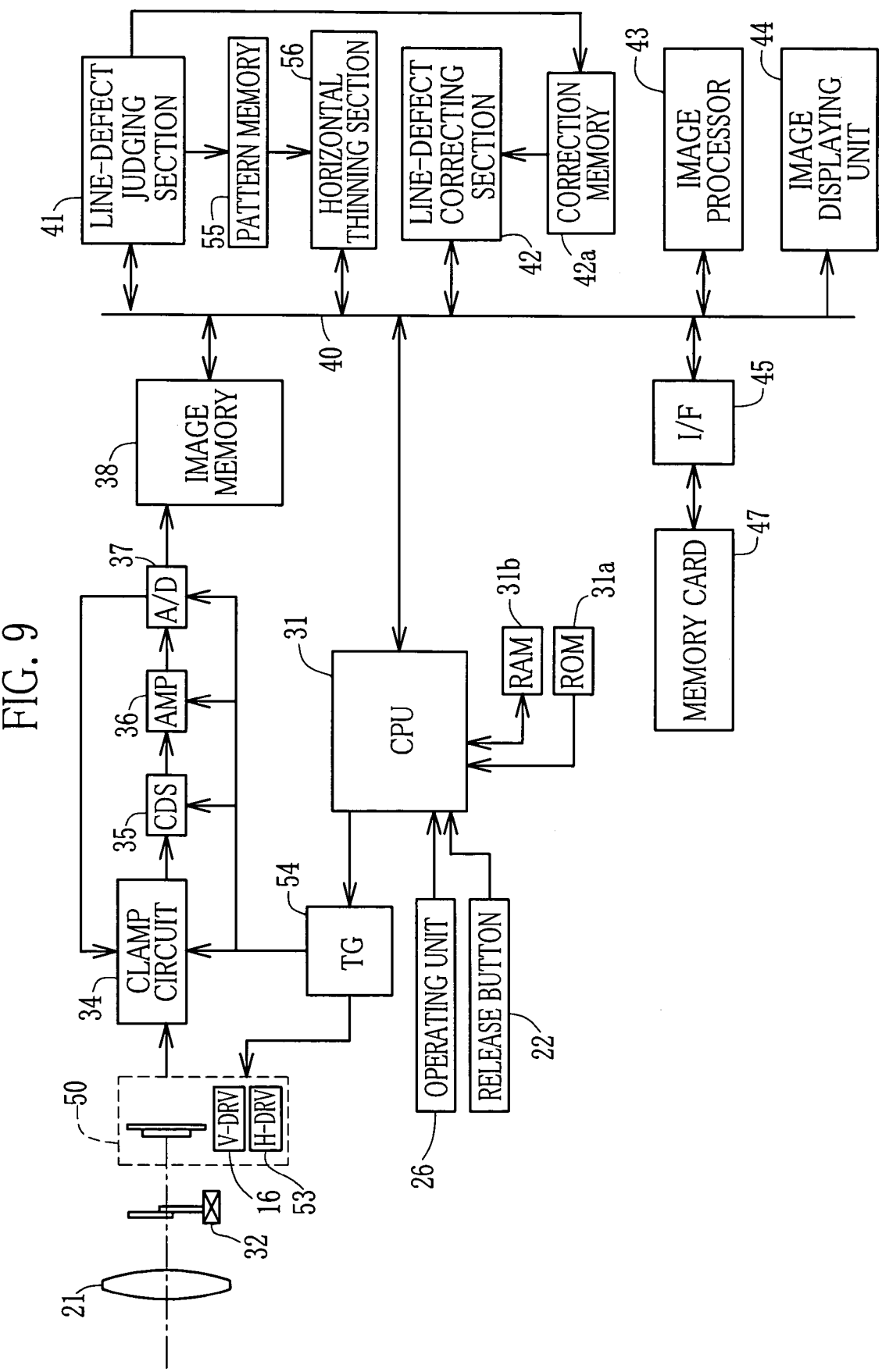
FIG. 9 is a block diagram showing a structure of an electronic camera utilizing the image sensor shown in FIG. 8.

FIG. 9 shows a structure of the electronic camera. The timing generator 54 outputs various signals including a vertical timing signal and a horizontal timing signal for the purpose of activating the image sensor 50. At the times when the moving-image mode is executed and when the through image is outputted, the timing generator 54 activates the image sensor 50 so as to thin the lines by two-pixel mixture. At this time, however, the timing generator 54 activates the image sensor 50 without thinning the pixel row. Since the pixel row is not thinned at the times of the moving-image mode and the through-image output, the image sensor 50 is activated at a frame rate of 15 frames per sec., for instance. Incidentally, the transfer of the signal charge and the structure concerning the image sensor 50 and the timing generator 54 are identical with those of the conventional CCD-type image sensor.

Under the adjustment mode, the line-defect judging section 41 writes the thinning pattern, which is used at the times of the moving-image mode and the through-image output, in a pattern memory 55. The thinning pattern is determined for each of the imaging sensitivities. When the defect is corrected on the basis of the line-defect information written in the correction memory 42a, the line-defect correcting section 42 refers to the contents of the pattern memory 55 and performs the defect correction only for the defective pixel rows to be read out in accordance with the set imaging sensitivity. Meanwhile, a horizontal thinning section 56 refers to the contents of the pattern memory 55 at the times of the moving-image mode and the through-image output. The horizontal thinning section 56 reads the image data from the image memory 38 in accordance with the thinning pattern, which corresponds to the set imaging sensitivity, to thin the pixel rows. In other words, only the image data of the even pixel rows are read out in the case that the thinning pattern is the even-row pattern, and only the image data of the odd pixel rows are read out in the case that the thinning pattern is the odd-row pattern.

The image data read out by the horizontal thinning section 56 is transferred to the image processor 43. Incidentally, under the still-image mode, the image data of the whole pixel rows are read out by the horizontal thinning section 56 after the defect correction. The read image data is transferred to the image processor 43. At the times of the moving-image mode and the through-image output, the image data of the image memory 38 may be read out in accordance with the thinning pattern, which corresponds to the set imaging sensitivity, instead of using the horizontal thinning section 56.

When the through image is outputted, the image signals of the whole pixel rows are outputted from the image sensor 50. The outputted image signal is converted into the image data. After that, the defect correction is performed only for the image data of the defective pixel row included in the pixel rows to be read in accordance with the thinning pattern corresponding to the set imaging sensitivity. After the defect correction, the image data is read out in accordance with the thinning pattern. The read image data is transferred to the image displaying unit 44 via the image processor 43 and is displayed on the LCD 25 when the through image is outputted. Meanwhile under the moving-image mode, the read image data is transferred to the interface circuit 45 and is recorded in the memory card 47. In this way, at the times of the moving-image mode and the through-image output, the defect correction is performed for the odd or even pixel rows including fewer defective pixel rows. In addition, the moving image is recorded and the through image is displayed in the condition that the defect correction is performed for fewer pixel rows.

In the second embodiment, thinning is performed after converting the image signal (voltage signal) into the image data. However, thinning may be performed at the stage of the image signal such as described in the following third embodiment.

Figure 10:
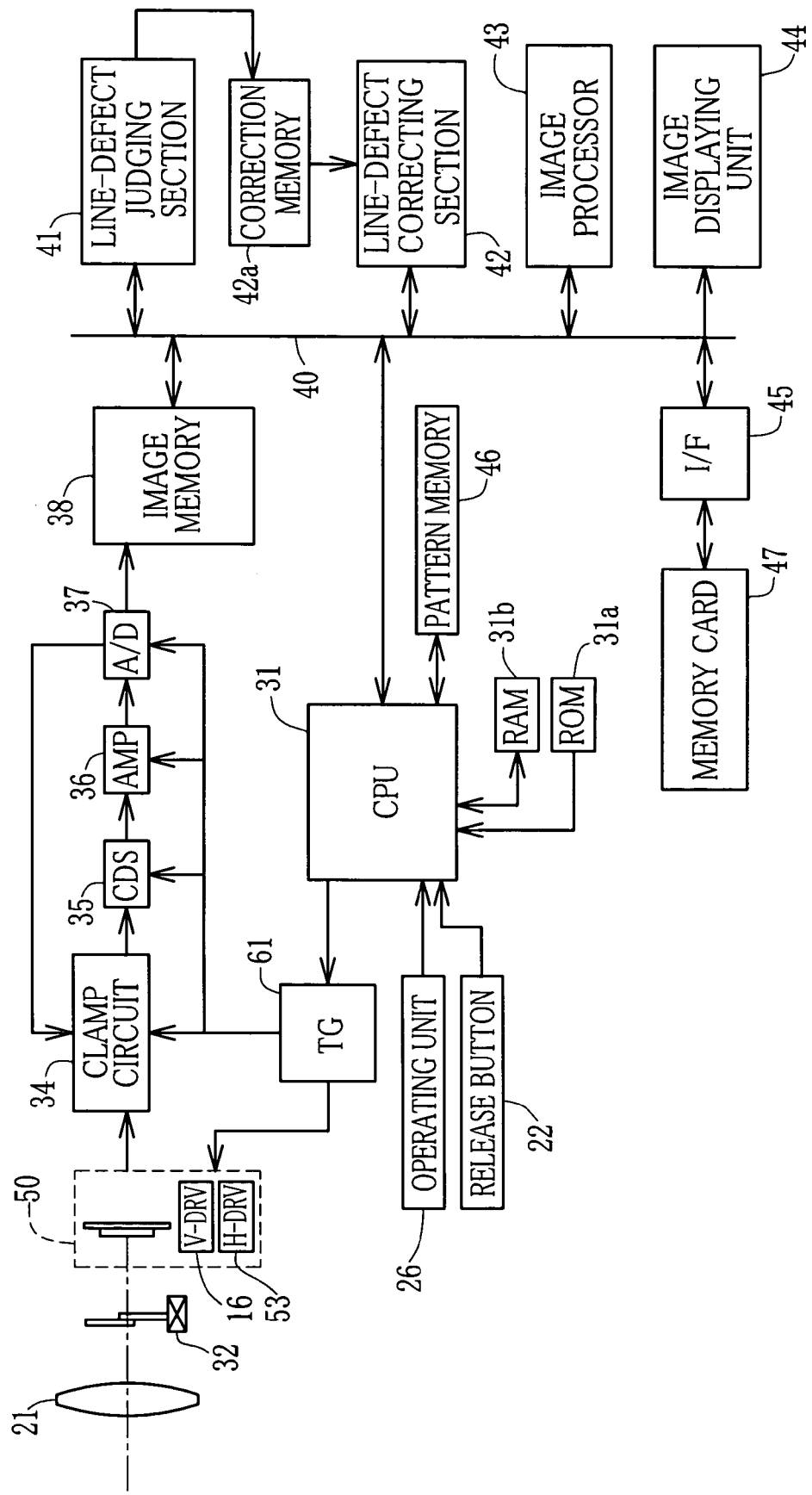
FIG. 10 is a block diagram showing a structure of an electronic camera in which thinning is performed by a CDS circuit.

FIG. 10 shows the third embodiment in which the pixel rows are thinned by using the CDS circuit. Incidentally, the third embodiment is similar to the first embodiment except the following. A component identical with that of the first embodiment is denoted by the same reference numeral and description thereof is abbreviated.

The image sensor 50 comprising the vertical transfer path and the horizontal transfer path has the same structure with the second embodiment. At the times when the through image is outputted and when the moving-image mode is executed, the CPU 31 accesses the pattern memory 46 to derive the thinning pattern corresponding to the set imaging sensitivity. Further, the CPU 31 sets the parameter to a timing generator 61 in accordance with the derived thinning pattern to control sample hold, which is performed by the timing generator 61 at the times of the through-image output and the moving-image mode. The parameter is set so as to make the timing generator 61 output an SHP signal (sample-hold pulse for preset level) and an SHD signal (sample-hold pulse for data level) for driving the CDS circuit 35. Concretely, the CDS circuit 35 is driven by the SHP signal and the SHD signal so as to output the image signal wherein the sample holding of the even row is performed in the case of the even-row pattern and the sample holding of the odd row is performed in the case of the odd-row pattern.

As shown in FIG. 11A, when the image signal of each line is outputted from the image sensor 50, signal components of the odd-row pixel and the even-row pixel are alternately outputted. A period for outputting the signal component of the sole pixel includes a zero-level period T1 during which a field-through component is outputted, and a pixel-signal period T2 during which a pixel-signal component is outputted in accordance with the signal charge of the pixel. The timing generator 61 outputs the SHP signal to the CDS circuit 35 during the zero-level period T1 and outputs the SHD signal to the CDS circuit 35 during the pixel-signal period T2. By outputting the SHP signal and the SHD signal to the CDS circuit 35, a difference between the pixel-signal component and the field-through component is outputted as the image signal.

In the case of the whole-row pattern, the timing generator 61 outputs the SHP signal and the SHD signal with respect to the respective pixels 12 regardless of the odd row and the even row, such as shown in FIG. 11A. Thus, the image signal of each pixel 12 of the odd and even rows is outputted. In the case of the odd-row pattern, the SHP signal and the SHD signal are outputted to the CDS circuit 35 when the signal of the odd-row pixel is outputted, such as shown in FIG. 11B. Thus, the even row is thinned and only the image signal of the odd-row pixel 12 is outputted. Similarly, in the case of the even-row pattern, the SHP signal and the SHD signal are outputted to the CDS circuit 35 when the signal of the even-row pixel is outputted, such as shown in FIG. 11C. Thus, the odd row is thinned and only the image signal of the even-row pixel 12 is outputted.

In the above embodiments, the electronic camera is provided with the adjustment mode to determine the thinning pattern of the pixel rows, and the determined thinning pattern is registered in the electronic camera itself. However, the electronic camera and the image sensor may be connected to an external inspection apparatus or the like to analyze the line defect, and the thinning pattern of the pixel rows determined by the inspection apparatus or the like may be registered in the electronic camera. When the line defect is detected, the shutter device is kept in the closed position. However, on condition that the light shielding state is secured, it is unnecessary to use the shutter device. The adjustment sequence may be executed in a darkroom during manufacture, for instance. Meanwhile, instead of closing the shutter device, the detection may be performed by using an image signal of a pixel included in an optical black region of the image sensor.

In the above embodiments, either of the odd-row pattern and the even-row pattern is selected to thin the odd pixel row or the even pixel row. The present invention, however, is not limited to these thinning patterns. For example, when the pixel rows are reduced to one-third, the thinning pattern is selected from among first to third patterns so as to minimize the line defect. In the case of the first pattern, the $(3n+1)$th pixel rows are read out. In this regard, n is equal to zero, one, two and so on. Consequently, $3n+1$ means one, four, seven and so on. In the case of the second pattern, the $(3n+2)$th (second, fifth, eighth and so on) pixel rows are read out. In the case of the third pattern, the $(3n+3)$th (third, sixth, ninth and so on) pixel rows are read out. Similarly, when the pixel rows are reduced to one-Mth, the thinning pattern is selected from among first to Mth patterns so as to minimize the line defect. In the respective cases of the first to Mth patterns, the $(3n+1)$th, $(3n+2)$th, $(3n+3)$th . . . $(3n+M)$th pixel rows are read out in accordance with the selected thinning pattern.

Instead of reading out the sole pixel row every M pixel rows such as described above, the pixel rows may be thinned such that three pixel rows are read from among successive seven pixel rows, for example. Further, positions of the three pixel rows to be read from among the successive seven pixel rows may be changed so as to minimize the line defect.

In the above embodiments, the image sensor includes the vertical transfer path separately from the pixel. However, it is possible to use a full-frame CCD, a frame transfer CCD and so forth in which the vertical transfer path (vertical transfer CCD) also works as a light receiver.

In the above embodiments, the line-shaped defect is caused by the vertical transfer path, and the white line-shaped defect of the entire line-shaped defects is detected and corrected. However, it is possible to detect and correct line-shaped uneven density caused by transfer efficiency of the vertical transfer path. In this case, the image sensor takes, for example, a blue background having uniform brightness to detect the pixel row of which threshold is equal to or less than a prescribed value. And then, the thinning pattern is selected so as to reduce the detected pixel rows. Further, in this case, the thinning pattern may be determined by considering feature quantity of the uneven density with respect to each of the thinning patterns. The feature quantity of the uneven density is obtained by comprehensively evaluating an occurrence number of the uneven density, a level thereof, an occurrence position thereof, a length thereof and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An electronic camera including an image sensor, on which a plurality of pixels are arranged in horizontal and vertical directions, and a sensitivity setter for setting one of imaging sensitivities, said image sensor including a vertical transfer path provided for each pixel row of the vertically arranged pixels to vertically move a signal charge of the corresponding pixel row, and a charge detector provided for each of the vertical transfer paths to convert said signal charge outputted from said vertical transfer path into a voltage signal, said electronic camera thinning said pixel rows under a thinning mode in accordance with the set imaging sensitivity, said electronic camera comprising:

a first memory for storing first row-information of the respective imaging sensitivities, said first row-information designating the pixel rows to be read out under said thinning mode, said pixel rows to be read out being determined so as to minimize defective pixel rows having line-shaped defect extending in the vertical direction;

a second memory for storing second row-information of the respective imaging sensitivities, said second row-information designating said defective pixel rows included in the pixel rows designated by said first row-information;

a horizontal scanning device for sequentially selecting said charge detectors of the pixel rows designated by said first row-information, which corresponds to the imaging sensitivity set by said sensitivity setter, under said thinning mode, said horizontal scanning device horizontally transferring and outputting the voltage signal of the selected charge detector; and a defect corrector for correcting the defect regarding said voltage signals of the pixel rows designated by said second row-information, which corresponds to the imaging sensitivity set by said sensitivity setter, under said thinning mode.

2. The electronic camera according to claim 1, further comprising:

a judgment device for judging said defective pixel rows on the basis of said voltage signals of all the pixels outputted from said image sensor; and a determination device for determining said first row-information and said second row-information regarding the respective imaging sensitivities in accordance with the defective pixel rows judged by said judgment device, said determination device storing said first row-information and said second row-information in said first memory and said second memory respectively.

3. The electronic camera according to claim 2, wherein said first row-information designates either of a first pixel-row group and a second pixel-row group as the pixel rows to be read, said first pixel-row group being composed of the even pixel rows and the second pixel-row group being composed of the odd pixel rows.

4. The electronic camera according to claim 3, wherein said pixels are shifted by half a pitch with respect to the adjacent pixel rows.

5. An electronic camera including an image sensor, on which a plurality of pixels are arranged in horizontal and vertical directions, and a sensitivity setter for setting one of imaging sensitivities, said image sensor including a vertical transfer path provided for each pixel row of the vertically arranged pixels to vertically move a signal charge of the corresponding pixel row, a horizontal transfer path for horizontally moving said signal charge received from said vertical transfer path, and a charge detector for converting said signal charge outputted from said horizontal transfer path into a voltage signal, said electronic camera thinning said pixel rows under a thinning mode in accordance with said imaging sensitivity, said electronic camera comprising:

a first memory for storing first row-information of the respective imaging sensitivities, said first row-information designating the pixel rows to be read out under said thinning mode, said pixel rows to be read out being determined so as to minimize defective pixel rows having line-shaped defect extending in the vertical direction;

a second memory for storing second row-information of the respective imaging sensitivities, said second row-information designating said defective pixel rows included in the pixel rows designated by said first row-information;

a thinning device for reading only the voltage signals of the pixel rows designated by said first row-information, which corresponds to the imaging sensitivity set by said sensitivity setter, under said thinning mode; and a defect corrector for correcting the defect regarding said voltage signals of the pixel rows designated by said second row-information, which corresponds to the imaging sensitivity set by said sensitivity setter, under said thinning mode.

6. The electronic camera according to claim 5, wherein said thinning device is a correlation double sampling circuit for outputting a difference, which exists between a reset level and a signal level of the pixel, to remove a noise.

7. The electronic camera according to claim 5, further comprising:

an image memory for storing image data digitally converted from said voltage signal of each pixel, which is outputted from said image sensor, said defect corrector correcting the defect for the image data of said image memory corresponding to the pixel row designated by said second row-information, and said thinning device deriving only the image data, which corresponds to the pixel row designated by said first row information, from said image memory.

8. The electronic camera according to claim 5, further comprising:

a judgment device for judging said defective pixel rows on the basis of said voltage signals of all the pixels outputted from said image sensor; and a determination device for determining said first row-information and said second row-information regarding the respective imaging sensitivities in accordance with the defective pixel rows judged by said judgment device, said determination device storing said first row-information and said second row-information in said first memory and said second memory respectively.

9. The electronic camera according to claim 8, wherein said first row-information designates either of a first pixel-row group and a second pixel-row group as the pixel rows to be read, said first pixel-row group being composed of the even pixel rows and the second pixel-row group being composed of the odd pixel rows.

10. The electronic camera according to claim 9, wherein said pixels are shifted by half a pitch with respect to the adjacent pixel rows.

* * * * *